(12) United States Patent
Cheng (10) Patent No.: US 12,287,934 B2
(45) Date of Patent: Apr. 29, 2025

(54) TOUCH AND DISPLAY DRIVING CIRCUIT AND OPERATION METHOD THEREOF

(71) Applicant: NOVATEK MICROELECTRONICS CORP., Hsinchu (TW)

(72) Inventor: Yen-Cheng Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 161 days.

(21) Appl. No.: 18/357,275

(22) Filed: Jul. 24, 2023

(65) Prior Publication Data
US 2025/0036233 A1    Jan. 30, 2025

(51) Int. Cl.
*G06F 3/041* (2006.01)
(52) U.S. Cl.
CPC ................ *G06F 3/04166* (2019.05)
(58) Field of Classification Search
None
See application file for complete search history.

(56) References Cited

U.S. PATENT DOCUMENTS

2015/0301675 A1* 10/2015 Sharma .......... H03K 19/017509
327/143
2022/0252648 A1* 8/2022 Nohtomi ............. G06F 3/04164

* cited by examiner

*Primary Examiner* — Nicholas J Lee
(74) *Attorney, Agent, or Firm* — Rosenberg, Klein & Lee (57) ABSTRACT

A touch and display driving circuit applicable to driving at least one sensing pad of a touch and display panel and its operation method thereof are provided. The touch and display driving circuit includes a source driver circuit and a touch circuit having an analog front-end circuit, being electrically coupled to the sensing pad of the touch and display panel. The source driver circuit is operable and connected with a first operational voltage and a second operational voltage. The analog front-end circuit is operable and connected with a third operational voltage and a fourth operational voltage. The first operational voltage and the second operational voltage of the source driver circuit are different from the third operational voltage and the fourth operational voltage of the analog front-end circuit. By employing the disclosed technical contents, the invention is effective in reducing power consumption and redundant power waste.

21 Claims, 12 Drawing Sheets

TOUCH AND DISPLAY DRIVING CIRCUIT AND OPERATION METHOD THEREOF

BACKGROUND OF THE INVENTION

Field of the Invention

The present invention is related to a touch and display driving technology. More particularly, the present invention is aimed to provide a touch and display driving circuit and its operation method thereof, so as to achieve optimal power reduction efficiency.

Description of the Prior Art

As known, in recent years, a touch with display driver, which is also known as a touch panel sensing chip, has been becoming a new touch technology solution that integrates a panel driver IC and a touch panel IC into one chip. In general, since the touch with display driving IC circuit, while compared to the traditional discrete solutions, including discrete touch, single layer on cell (SLOC), and embedded in cell touch technologies, is characterized by a less complicated structure and does not require to use films and adhesives materials, it makes the touch with display driving IC circuit much more advantageous in view of both fabrication cost and production yield.

On the other hand, for design manufacturers, the architecture of the touch with display driving IC circuit also helps to simplify its circuit design and shorten the development schedule. For end customers, since the supply chain structure can be simplified, it makes the procurement of the end customers much more convenient than ever. However, it is still noticeable that the power consumption of a touch with display driving IC circuit may be an issue. As we already know, an average power consumption refers to the average power consumption of the touch panel system. It comprises the working time of the controller (including scanning, processing, communication, sleep, etc.) and the time for the main processor to receive and interpret any input touch data. Therefore, it makes power consumption of the touch panel system a very common performance parameter. In terms of power consumption of the touch panel system, it is evident that a more precise calculation formula may be required because different usage modes will produce different power consumption.

For example, when regarding a touch with display analog circuit, since its source driver of the display is usually divided into positive and negative polarities, so as to work in a positive power voltage domain and a negative power voltage domain, it makes its touch circuit connected thereto to be necessary to switch between different operating voltages while performing sensing and performing displaying, respectively. Such switching procedure not only costs additional operation time, but also results in redundant power consumption. Therefore, it is believed that an overall power consumption of the touch and display panel may be enormously increased and become an issue to be overcome, which makes continual improvements in power efficiency remains desirable. In order to ensure that touch and display panels do not consume too much power, several methods have been discussed these days in the current technology and yet, challenges are still remained. Further reductions in power consumption and alternative methodologies in the field are still to be expected.

As a result, it, in view of all, should be apparent and obvious that there is indeed an urgent need for the professionals in the field for a novel and inventive touch and display driving circuit as well as its operation method thereof, to be developed, so as to solve the above-mentioned issues, and to enhance the power reduction efficiency.

SUMMARY OF THE INVENTION

In order to overcome the above-mentioned disadvantages, one major objective in accordance with the present invention is to provide a novel touch and display driving circuit, which is applicable to driving at least one sensing pad of a touch and display panel.

Another objective in accordance with the present invention is to provide a novel operation method of the touch and display driving circuit applicable to driving at least one sensing pad of the touch and display panel. By employing the proposed touch and display driving circuit and its operation method thereof, it is believed that optimization of power consumption of the touch and display panel can be achieved due to less switching time of its touch circuit (which is the disclosed analog front-end circuit) while respectively performing displaying and sensing mode is required. Therefore, it is verified that, redundant power waste when employing the present invention, is effectively avoided.

According to the embodiment of the present invention, a touch and display driving circuit applicable to driving at least one sensing pad of a touch and display panel is provided. The touch and display driving circuit comprises a source driver circuit, which is electrically connected with a first operational voltage and a second operational voltage; and an analog front-end circuit. The analog front-end circuit is electrically coupled to the at least one sensing pad of the touch and display panel and operable to driving the at least one sensing pad of the touch and display panel.

According to the present invention, the analog front-end circuit is a touch circuit, which is adapted to drive the at least one sensing pad of the touch and display panel which is electrically connected thereto the analog front-end circuit in order to sense a touch input. The analog front-end circuit is operable and electrically connected with a third operational voltage and a fourth operational voltage, and the first operational voltage and the second operational voltage of the source driver circuit are different voltages from the third operational voltage and the fourth operational voltage of the analog front-end circuit.

According to the embodiment of the present invention, the third operational voltage of the analog front-end circuit is greater than a common electrode voltage (VCOM) of the at least one sensing pad, and the fourth operational voltage of the analog front-end circuit is less than the common electrode voltage (VCOM) of the at least one sensing pad.

Preferably, when the third operational voltage of the analog front-end circuit is defined as "VTSP", the fourth operational voltage of the analog front-end circuit is defined as "VTSN", and a maximum operable voltage drop across the analog front-end circuit is defined as "VACS", it is determined in the present invention, that (VTSP−VTSN) <VACS.

Moreover, according to one embodiment of the present invention, the disclosed source driver circuit may include a first source driving operational amplifier and a second source driving operational amplifier which is connected in series with the first source driving operational amplifier. The first source driving operational amplifier is electrically connected between the first operational voltage and a ground voltage, and the second source driving operational amplifier is electrically connected between the second operational voltage and the ground voltage, such that the first source driving operational amplifier is a positive-polarity operational amplifier which is operable in a positive-voltage domain, and the second source driving operational amplifier is a negative-polarity operational amplifier which is operable in a negative-voltage domain.

Moreover, according to one preferable embodiment of the present invention, it is feasible that, either the first source driving operational amplifier, the second source driving operational amplifier of the source driver circuit, or the analog front-end circuit can be fabricated by using middle-voltage (MV) electrical components.

As a result, according to the embodiment of the present invention, when the touch and display panel is operated for displaying, the at least one sensing pad of the touch and display panel is electrically connected to the common electrode voltage. On the contrary, when the touch and display panel is operated for a touch sense, then the at least one sensing pad of the touch and display panel is electrically connected to a sensing voltage, and the sensing voltage is related to the analog front-end circuit.

In details, the described sensing voltage is in a range between the third operational voltage and the fourth operational voltage of the analog front-end circuit. The determined sensing voltage is less than the third operational voltage and greater than the fourth operational voltage of the analog front-end circuit.

Furthermore, according to the present invention, the touch and display driving circuit may further include at least one regulator circuit, such that the analog front-end circuit is electrically connected with the at least one regulator circuit. And accordingly, the third operational voltage or the fourth operational voltage of the analog front-end circuit can be generated in related to the first operational voltage or the second operational voltage of the source driver circuit.

Optionally, according to one another embodiment of the present invention, then the third operational voltage or the fourth operational voltage of the analog front-end circuit may also be alternatively generated and provided by a power supplied voltage or by an external power management integrated chip as well. The alternatives and modifications will be apparent to those skilled in the art, once informed by the present disclosure. And the present disclosure claims and covers the alternatives and modifications with equality.

In addition, the present invention is also provided to disclose an operation method which is applicable to a touch and display driving circuit adapted to driving at least one sensing pad of a touch and display panel, for example. However, the present invention is certainly not limited thereto. Such operation method and the touch and display driving circuit which is applied to, as provided in the present invention may also be widely utilized in view of other circuit configurations of various touch with display devices. Many alternatives and modifications will be apparent to those skilled in the art, once informed by the present disclosure.

According to the embodiment of the present invention, the disclosed operation method of a touch and display driving circuit is applicable to driving at least one sensing pad of a touch and display panel, and the touch and display driving circuit includes a source driver circuit and an analog front-end circuit coupled to the at least one sensing pad. The disclosed operation method comprises the following steps, including providing a first operational voltage and a second operational voltage to the source driver circuit; and providing a third operational voltage and a fourth operational voltage to the analog front-end circuit. According to the present invention, it is determined that the first operational voltage and the second operational voltage are different from the third operational voltage and the fourth operational voltage.

As a result, when adopting the proposed technical contents of the present invention, it is believed that when the touch and display panel is operated for displaying, the at least one sensing pad of the touch and display panel is electrically connected to a common electrode voltage, and when the touch and display panel is operated for a touch sense, the at least one sensing pad of the touch and display panel is electrically connected to a sensing voltage, and the sensing voltage is less than the third operational voltage and greater than the fourth operational voltage of the analog front-end circuit.

And as such, it is believed that by employing the proposed touch and display driving circuit and its operation method thereof the invention, while the touch and display panel is switched between performing a displaying function and a touch sensing function, a much less switchover in voltage changes is required, such that the power consumption compared to the prior arts is thus, greatly much reduced. In addition, the prior severe power consumption issues are believed to be eliminated in the present invention. Thereby, it is believed that the present invention achieves to successfully solve the problems of prior arts and performs as being highly competitive and able to be widely utilized in any related industries.

To sum up, it has been proved and verified that the present invention is sophisticatedly designed, and the whole new driving techniques can be employed in a touch and display driving circuit architecture and has succeeded in minimizing its IC power consumption. Meanwhile, redundant power waste is effectively avoided while compared to the prior arts.

These and other objectives of the present invention will become obvious to those of ordinary skill in the art after reading the following detailed description of preferred embodiments.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following descriptions, a touch and display driving circuit which is applicable to driving at least one sensing pad of a touch and display panel will be provided. In addition, the present invention also provides an operation method of the disclosed touch and display driving circuit thereof. According to the provided application, the proposed touch and display driving circuit and its operation method thereof are able to achieve in power optimization for touch and display panel devices. Alternatively, the disclosed technologies regarding the touch and display driving circuit and driving method, as provided in the following descriptions may also be applied to other circuit configurations. The present invention is not limited thereto.

Figure 1:
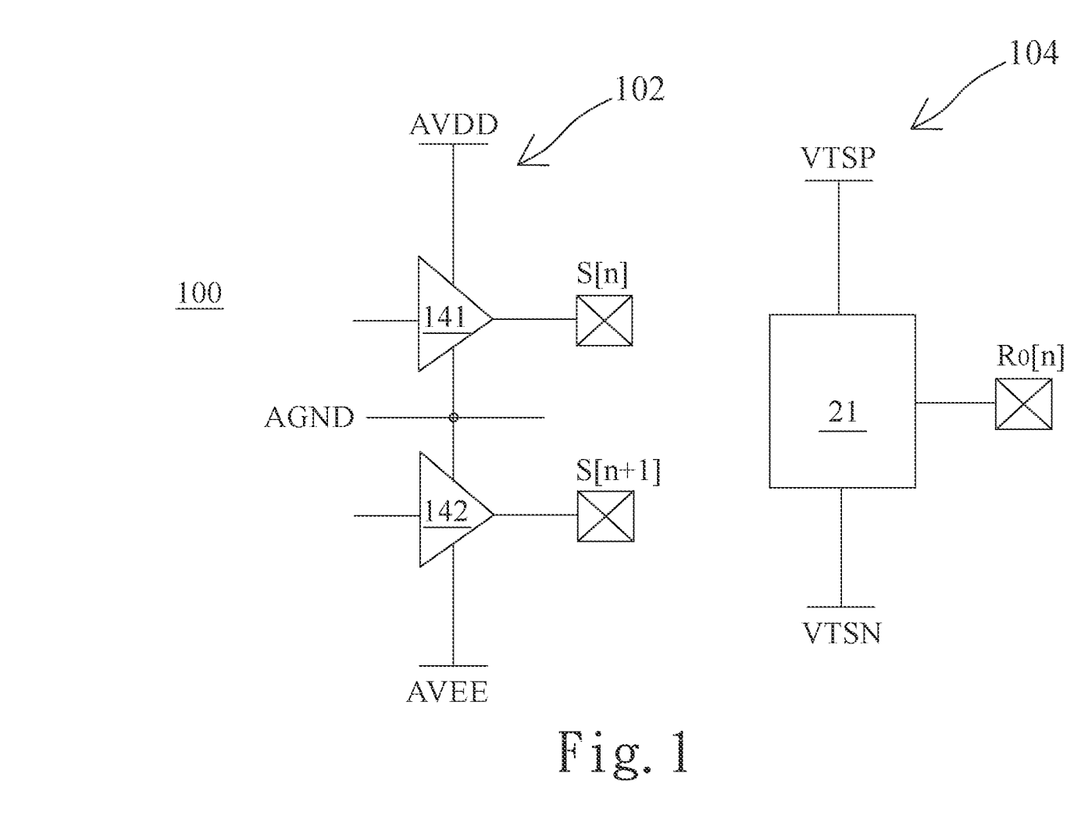
FIG. 1 shows a diagram schematically illustrating a touch and display driving circuit in accordance with a first embodiment of the invention.
Figure 2:
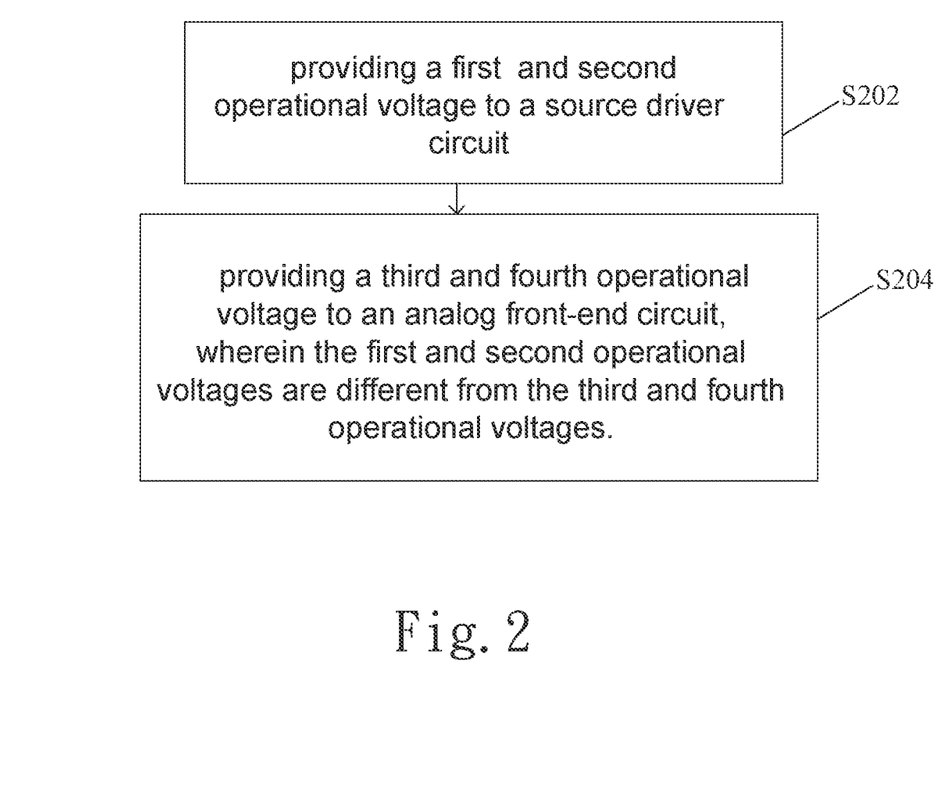
FIG. 2 shows a flow chart illustrating an operation method of the touch and display driving circuit according to the first embodiment as shown in FIG. 1.

Please refer to FIG. 1, which shows a diagram schematically illustrating a touch and display driving circuit in accordance with a first embodiment of the invention. FIG. 2 shows a flow chart illustrating an operation method of the touch and display driving circuit according to the first embodiment as shown in FIG. 1. As referring to FIG. 1 in addition to FIG. 2, the present invention is aimed to provide a touch and display driving circuit 100, and the touch and display driving circuit 100 applicable to driving at least one sensing pad of a touch and display panel will be introduced as follows.

According to the embodiment of the present invention, the touch and display driving circuit 100 includes a source driver circuit 102 which is operable and being electrically connected with a first operational voltage AVDD and a second operational voltage AVEE.

Regarding a detailed configuration of the source driver circuit, as can be seen from the embodiment as shown in FIG. 1, the source driver circuit 102 may include a first source driving operational amplifier 141 and a second source driving operational amplifier 142 which is connected in series with the first source driving operational amplifier 141. According to the present invention, the first source driving operational amplifier 141 is electrically connected between the first operational voltage AVDD and a ground voltage AGND such that the first source driving operational amplifier 141 is a positive-polarity operational amplifier which is operable in a positive-voltage domain.

On the other hand, the second source driving operational amplifier 142 is electrically connected between the second operational voltage AVEE and the ground voltage AGND such that the second source driving operational amplifier 142 is a negative-polarity operational amplifier which is operable in a negative-voltage domain. According to the embodiment of the present invention, the first source driving operational amplifier 141 and the second source driving operational amplifier 142 of the source driver circuit 102 are preferably, fabricated by using middle-voltage (MV) electrical components.

In addition to the disclosed source driver circuit 102, the touch and display driving circuit 100 may also include a touch circuit 104, and the touch circuit 104 is operable for driving at least one sensing pad of a touch and display panel in order to sense a touch input. For example, the touch input may be an input signal of a user's finger, stylus, or any input object which may generate a touch input signal. The touch circuit 104 is operable and being electrically connected with a third operational voltage VTSP and a fourth operational voltage VTSN for driving the at least one sensing pad of the touch and display panel. Accordingly, when regarding and considering the detailed configurations of the proposed touch circuit, please find FIG. 3 and FIG. 4 for two feasible circuit layouts that the Applicants of the invention have provided, for implementations of the disclosed touch circuit in accordance with the present invention.

Figure 3:
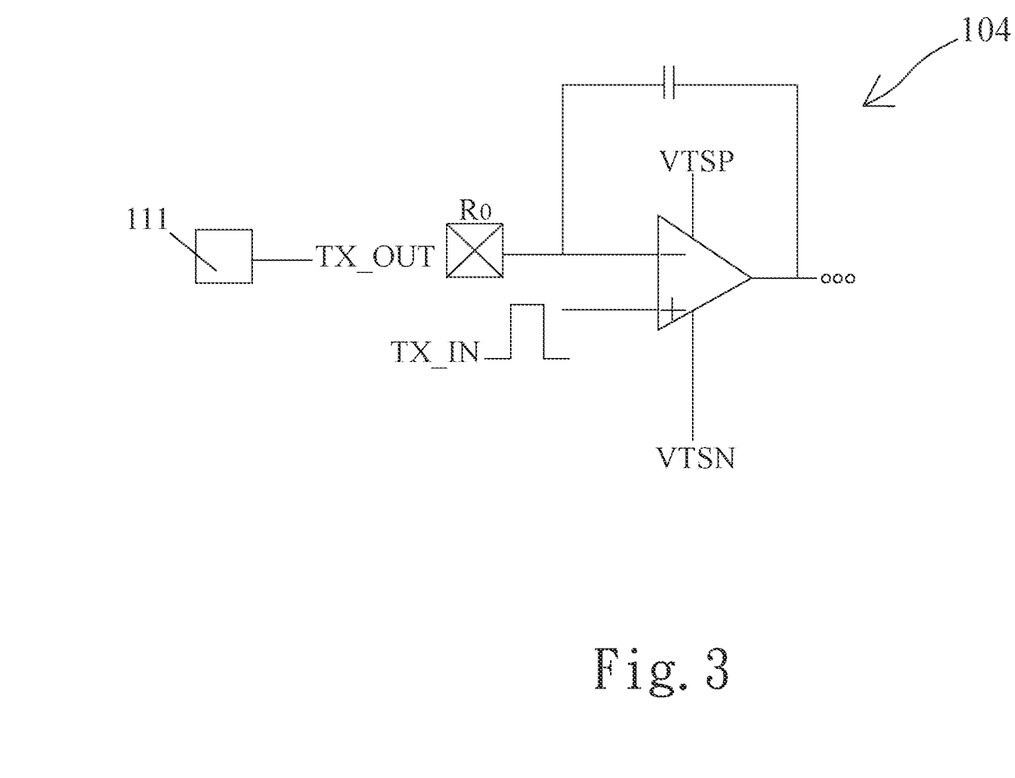
FIG. 3 schematically shows a circuit layout configuration of the disclosed touch circuit when the touch circuit is a voltage type circuit configuration in accordance with one embodiment of the present invention.

As can be seen first, FIG. 3 schematically shows that the touch circuit 104 is a voltage type circuit configuration, which is adapted to generate a transmitting (TX) output signal TX_OUT according to a received TX input signal TX_IN so as to use the TX output signal TX_OUT to drive the at least one sensing pad 111 of a touch and display panel. In addition, please refer to FIG. 4, in which FIG. 4, on the other hand, schematically shows another practicable circuit layout, indicating that the touch circuit 104 may also be implemented by using a current type circuit configuration such that the touch circuit 104 can be operable to generate a transmitting (TX) output signal TX_OUT according to a received TX input signal TX_IN so as to use the TX output signal TX_OUT to drive the at least one sensing pad 111 of a touch and display panel. Both circuit layout configurations hereinafter proposed in FIG. 3 as well as in FIG. 4 can be adopted for performing and implementing the disclosed touch circuit 104 of the present invention.

Figure 4:
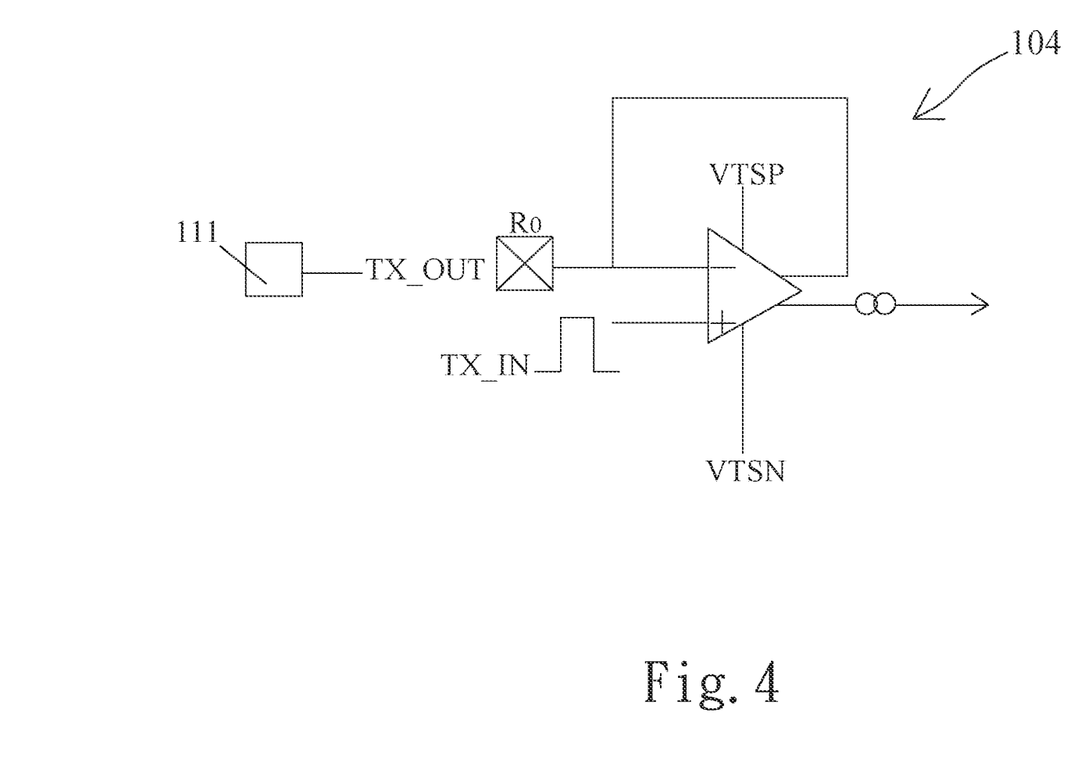
FIG. 4 schematically shows another circuit layout configuration of the disclosed touch circuit when the touch circuit is a current type circuit configuration in accordance with another embodiment of the present invention.

In the following descriptions, please refer to the flow chart as described in FIG. 2 of the present invention at the same time. The flow chart disclosed in FIG. 2 is an operation method of the touch and display driving circuit 100 which is applicable to driving at least one sensing pad of a touch and display panel as previously mentioned in FIG. 1. As described earlier, the touch and display driving circuit 100 includes the source driver circuit 102 and the touch circuit 104, and the touch circuit 104 is preferably an analog front-end circuit 21 and electrically coupled to the at least one sensing pad. As a result, according to the disclosed operation method of the present invention, as illustrated in the step S202 in FIG. 2, it is determined that the first operational voltage AVDD and the second operational voltage AVEE will be provided to the source driver circuit 102 first. And according to the embodiment as illustrated in FIG. 1, FIG. 3 and FIG. 4 of the present invention, the above-disclosed touch circuit 104 is preferably an analog front-end circuit 21 which is fabricated by using middle-voltage (MV) electrical components. And accordingly, as subsequently illustrated in the step S204 in FIG. 2, the present invention proceeds to perform for providing the third operational voltage VTSP and the fourth operational voltage VTSN to the analog front-end circuit 21 which is electrically coupled to the at least one sensing pad 111 of the touch and display panel.

According to the embodiment of the present invention, it is determined that the first operational voltage AVDD and the second operational voltage AVEE of the source driver circuit 102 are different voltages from the third operational voltage VTSP and the fourth operational voltage VTSN of the analog front-end circuit 21.

To be more specific, it is practically feasible to configure that when a maximum operable voltage drop across the analog front-end circuit 21 is VACS, then it is determined by the present invention that (VTSP−VTSN)<VACS. In one embodiment of the present invention, the third operational voltage VTSP of the analog front-end circuit 21 can be, for instance, +3V while the fourth operational voltage VTSN of the analog front-end circuit 21 can be −3V. Alternatively, according to other implementation embodiment of the present invention, then the third operational voltage VTSP of the analog front-end circuit 21 may also be, for instance, +4V while the fourth operational voltage VTSN of the analog front-end circuit 21 can be −2V, or the third operational voltage VTSP of the analog front-end circuit 21 can be +2V while the fourth operational voltage VTSN of the analog front-end circuit 21 can be −1V. It should be noted that the disclosed invention is certainly not limited to the foregoing specific voltage values thereto. In general, according to the technical solution provided by the present invention, it should be understood that, the third operational voltage VTSP of the analog front-end circuit 21 is set to be greater than a common electrode voltage VCOM of the at least one sensing pad, and the fourth operational voltage VTSN of the analog front-end circuit 21 is set to be less than the common electrode voltage VCOM of the at least one sensing pad. As a result, by employing such technical solution that an operable voltage range of the analog front-end circuit 21 (which is VTSP-VTSN) covers the common electrode voltage VCOM, it is derived that, when the touch and display panel is operated for displaying, then the sensing pad of the touch and display panel is electrically connected to the common electrode voltage VCOM, which is in a range between the third operational voltage VTSP and the fourth operational voltage VTSN of the analog front-end circuit 21. While when the touch and display panel is operated for a touch sense, then the at least one sensing pad of the touch and display panel is electrically connected to a sensing voltage, and the sensing voltage is less than the third operational voltage VTSP and greater than the fourth operational voltage VTSN of the analog front-end circuit 21. As a result, the voltage modulation can be directly performed in view of the third operational voltage VTSP, the common electrode voltage VCOM and the fourth operational voltage VTSN of the analog front-end circuit 21. Additional toggling time for voltage switching, as required in the current design arts can be significantly omitted.

Figure 5:
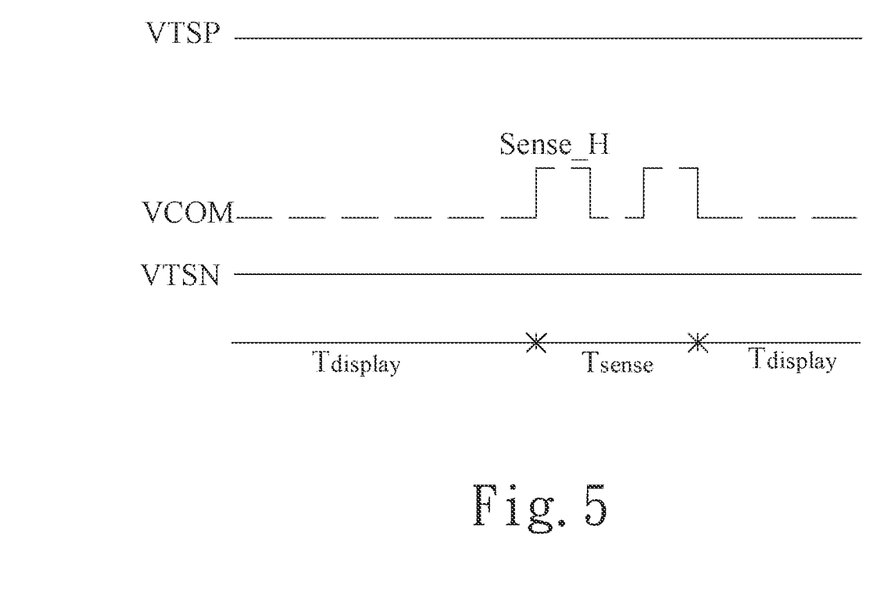
FIG. 5 schematically shows one variant embodiment of the present invention, in which the voltage modulation is achieved under the condition that VTSN<VCOM<VTSP.
Figure 6:
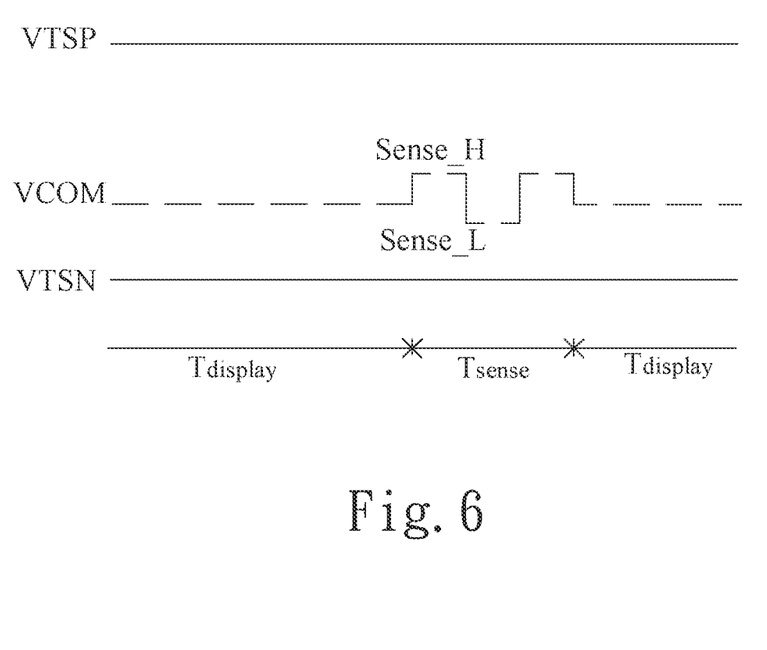
FIG. 6 schematically shows another variant embodiment of the present invention, in which the voltage modulation is achieved under the condition that VTSN<VCOM<VTSP.

Please proceed to refer to FIG. 5 and FIG. 6, in which FIG. 5 and FIG. 6 are provided to show two variant embodiments of the present invention, in which the voltage modulation is achieved under the condition that VTSN<VCOM<VTSP. As we can see, when the touch and display panel is operated for displaying in the time period of a display time "$T_{display}$", the at least one sensing pad of the touch and display panel is electrically connected to a common electrode voltage VCOM. On the other hand, when the touch and display panel is operated for a touch sense in the time period of a sensing time "$T_{sense}$", then the at least one sensing pad of the touch and display panel will be electrically connected to a sensing voltage. As indicated in the embodiment in FIG. 5, when in the time period of the sensing time $T_{sense}$ wherein the touch and display panel is operated for a touch sense, the sensing voltage that the sensing pad is electrically connected to is in a range between the sensing high voltage Sense_H and the common electrode voltage VCOM. And yet, the present invention is not limited thereto. Alternatively, according to another embodiment as illustrated in FIG. 6, it may also be practicable to design that when in the time period of the sensing time $T_{sense}$ wherein the touch and display panel is operated for a touch sense, then the sensing voltage that the sensing pad is electrically connected to is in a range between the sensing high voltage Sense_H and the sensing low voltage Sense_L. Generally saying, according to the present invention, the disclosed sensing voltage will be in a range between the third operational voltage VTSP and the fourth operational voltage VTSN, indicating that the sensing voltage is less than the third operational voltage VTSP and greater than the fourth operational voltage VTSN, and the voltage range between the third operational voltage VTSP and the fourth operational voltage VTSN of the analog front-end circuit 21 covers the common electrode voltage VCOM.

As a result, it is believed that by employing the touch and display driving circuit and its operation method thereof to drive at least one sensing pad of a touch and display panel, the touch and display panel is characterized by an improved power reduction enhancement since conventional toggling time for voltage switching in between displaying and sensing modes is obviously avoided and omitted. And since the conventional power waste is reduced, a total IC power consumption of the touch and display panel is decreased as well, indicating that, redundant power waste is avoided. It is thus, believed that the disclosed touch and display driving circuit and operation method thereof are effective in solving the severe power-consuming problems existing in the prior arts.

Figure 7:
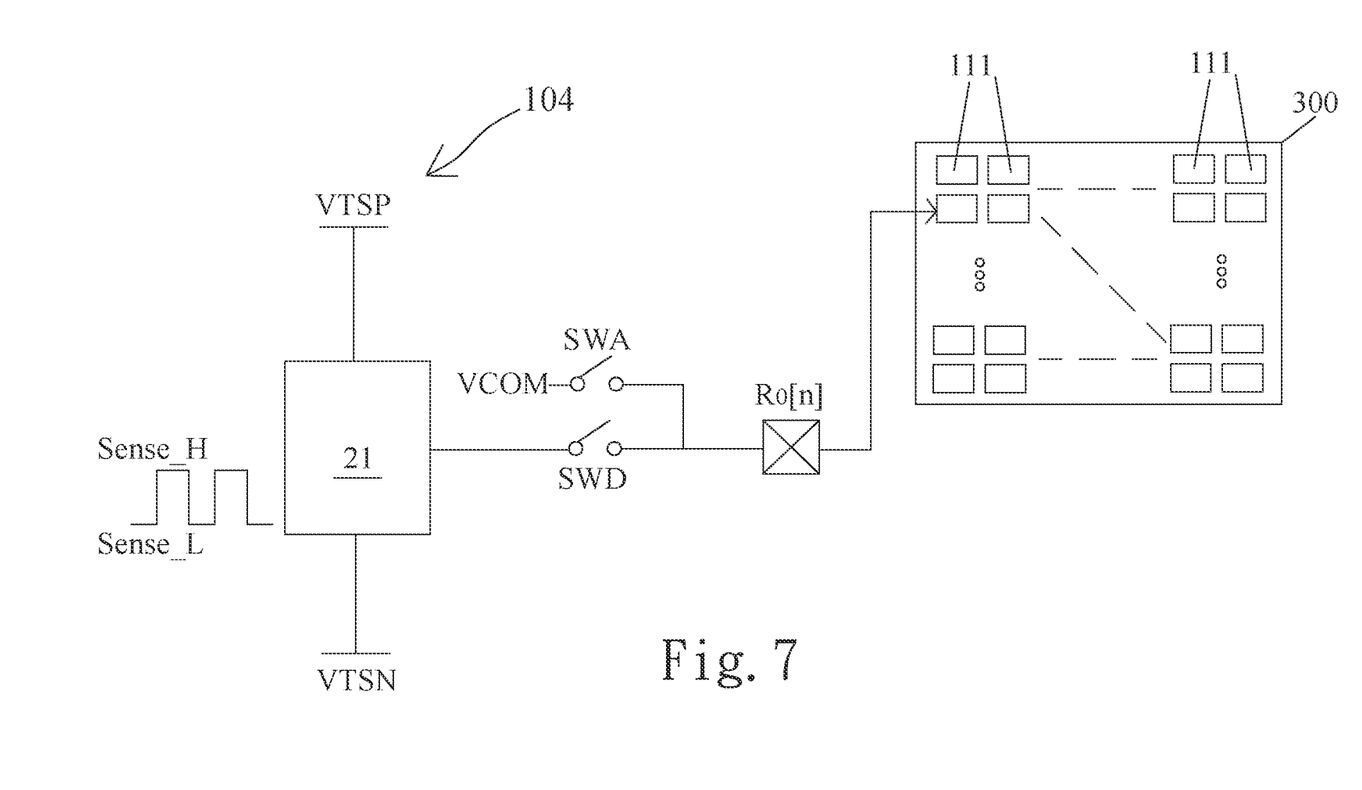
FIG. 7 schematically shows a diagram illustrating the touch and display driving circuit which is operable to drive at least one sensing pad of a touch and display panel in view of the embodiment of the present invention.
Figure 8:
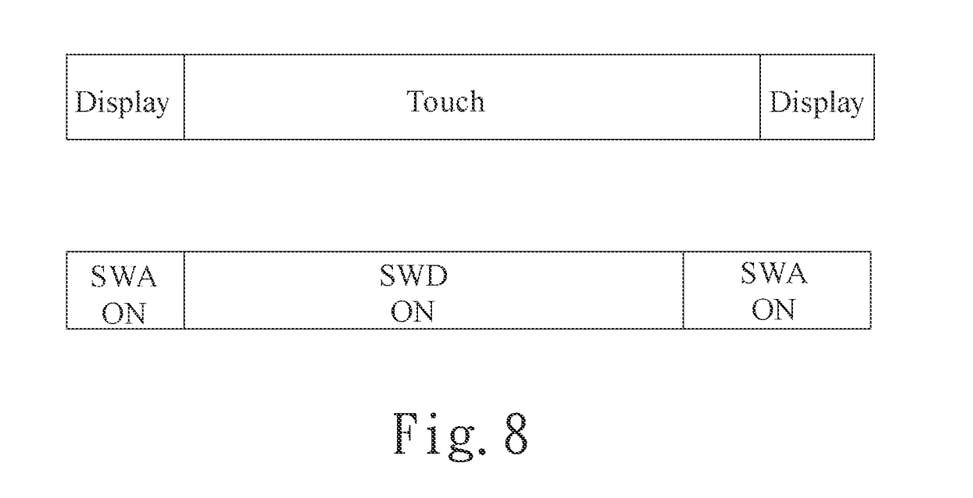
FIG. 8 schematically shows the timing diagram in accordance with the application structure in FIG. 7.

Moreover, please refer to FIG. 7 for an application architecture of the disclosed embodiment of the present invention, in which FIG. 7 schematically shows a diagram illustrating the touch and display driving circuit which is operable to drive at least one sensing pad 111 of the touch and display panel 300 in view of the embodiment of the present invention. FIG. 8 schematically shows the timing diagram in accordance with the application structure in FIG. 7. As can be seen from FIG. 7 along with FIG. 8, it is apparent that when the touch and display panel 300 is operated for displaying, the switch SWA is turned on such that the sensing pad 111 is electrically connected to the common electrode voltage VCOM. And while the touch and display panel 300 is switched to be operated for a touch sense, then the switch SWA will be turned off and the switch SWD will be turned on, such that the sensing pad 111 is turned to be electrically connected to a sensing voltage in between the sensing high voltage Sense_H and the sensing low voltage Sense_L. As the Applicants have described in the earlier descriptions, the sensing voltage is less than the third operational voltage VTSP and greater than the fourth operational voltage VTSN. Therefore, the voltage modulation can be simply performed between the third operational voltage VTSP, the common electrode voltage VCOM and the fourth operational voltage VTSN without redundant power switch consumption, and the present invention effectively achieves in power optimization of a touch and display panel device.

Figure 9:
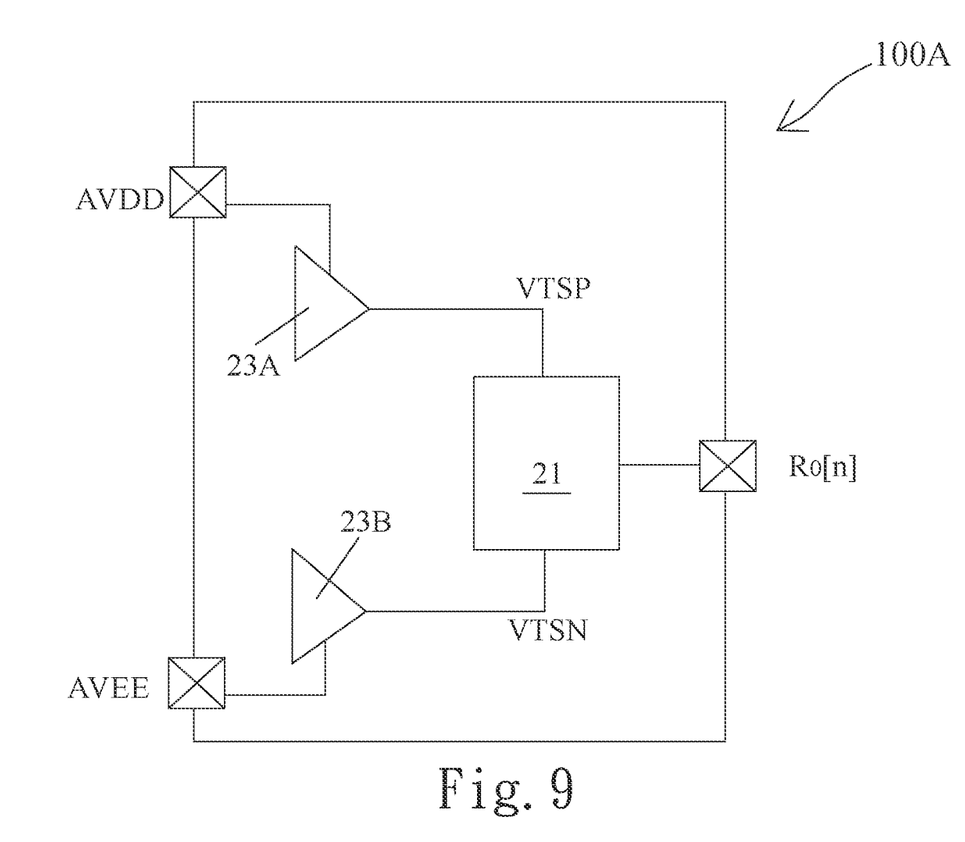
FIG. 9 shows a diagram schematically illustrating a touch and display driving circuit in accordance with a second embodiment of the present invention, in which a first regulator circuit and a second regulator circuit are further disposed.

And furthermore, please proceed to refer to FIG. 9, which shows a diagram schematically illustrating a touch and display driving circuit in accordance with a second embodiment of the present invention. As can be seen, the touch and display driving circuit 100A further comprises a first regulator circuit 23A and a second regulator circuit 23B, and the analog front-end circuit 21 is electrically connected with the first regulator circuit 23A and with the second regulator circuit 23B as well. In such an embodiment, the first regulator circuit 23A is electrically coupled with the first operational voltage AVDD. And the second regulator circuit 23B is electrically coupled with the second operational voltage AVEE such that the third operational voltage VTSP of the analog front-end circuit 21 can be generated in related to the first operational voltage AVDD, and the fourth operational voltage VTSN of the analog front-end circuit 21 can be generated in related to the second operational voltage AVEE.

Figure 10:
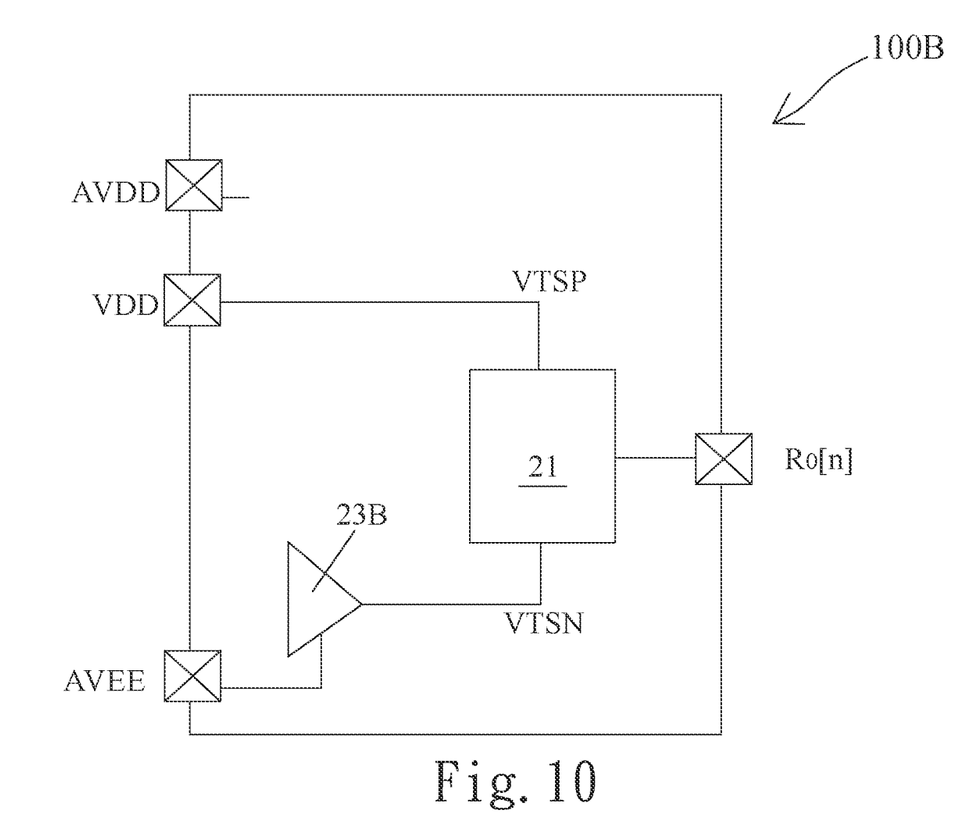
FIG. 10 shows another diagram schematically illustrating a touch and display driving circuit in accordance with a third embodiment of the present invention, in which only one regulator circuit is further disposed.

Nevertheless, the present invention is certainly not limited to such an embodiment. Please refer to FIG. 10, which shows another diagram schematically illustrating a touch and display driving circuit in accordance with a third embodiment of the present invention. As can be seen, the touch and display driving circuit 100B is also alternatively configured to include one second regulator circuit 23B, and the analog front-end circuit 21 is only electrically connected with the second regulator circuit 23B. In such a modified embodiment, the second regulator circuit 23B is electrically coupled with the second operational voltage AVEE such that the fourth operational voltage VTSN of the analog front-end circuit 21 can be generated in related to the second operational voltage AVEE. As for the third operational voltage VTSP of the analog front-end circuit 21 in such an embodiment, the third operational voltage VTSP will be generated and provided by a power supplied voltage VDD.

Figure 11:
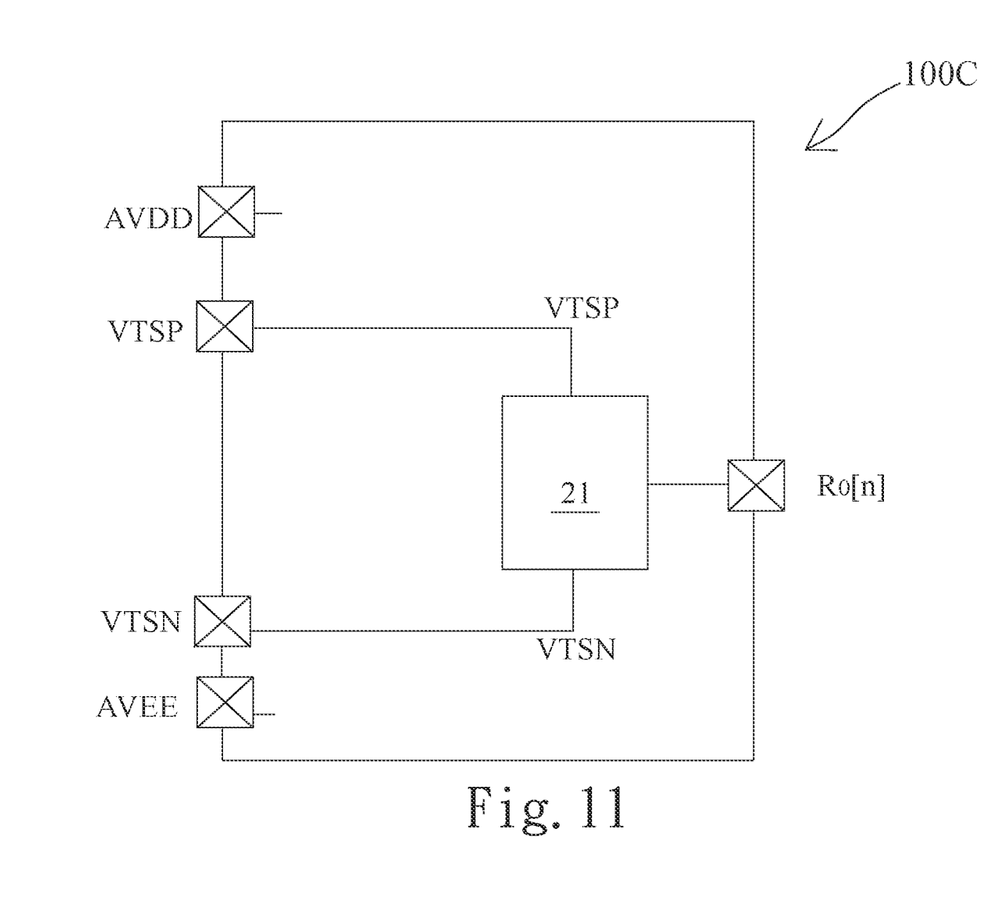
FIG. 11 shows another diagram schematically illustrating a touch and display driving circuit in accordance with a fourth embodiment of the present invention, in which no regulator circuit is further disposed, and the operational voltages of the analog front-end circuit are generated and provided by an external power management integrated chip.

In addition, please refer to FIG. 11, which further shows another diagram schematically illustrating a touch and display driving circuit in accordance with a fourth embodiment of the present invention. As can be seen, the disclosed touch and display driving circuit 100C may be also alternatively configured without including the above-mentioned regulator circuit. And in such an embodiment, then the third operational voltage VTSP and the fourth operational voltage VTSN of the analog front-end circuit 21 are independent and have nothing to do with the first operational voltage AVDD and the second operational voltage AVEE of the source driver circuit. According to the embodiment as illustrated in FIG. 11, it is derived that the third operational voltage VTSP and the fourth operational voltage VTSN of the analog front-end circuit 21 will be generated and provided by an external power management integrated chip, and such an embodiment can also be adopted for implementing the inventive effects of the present invention.

Figure 12:
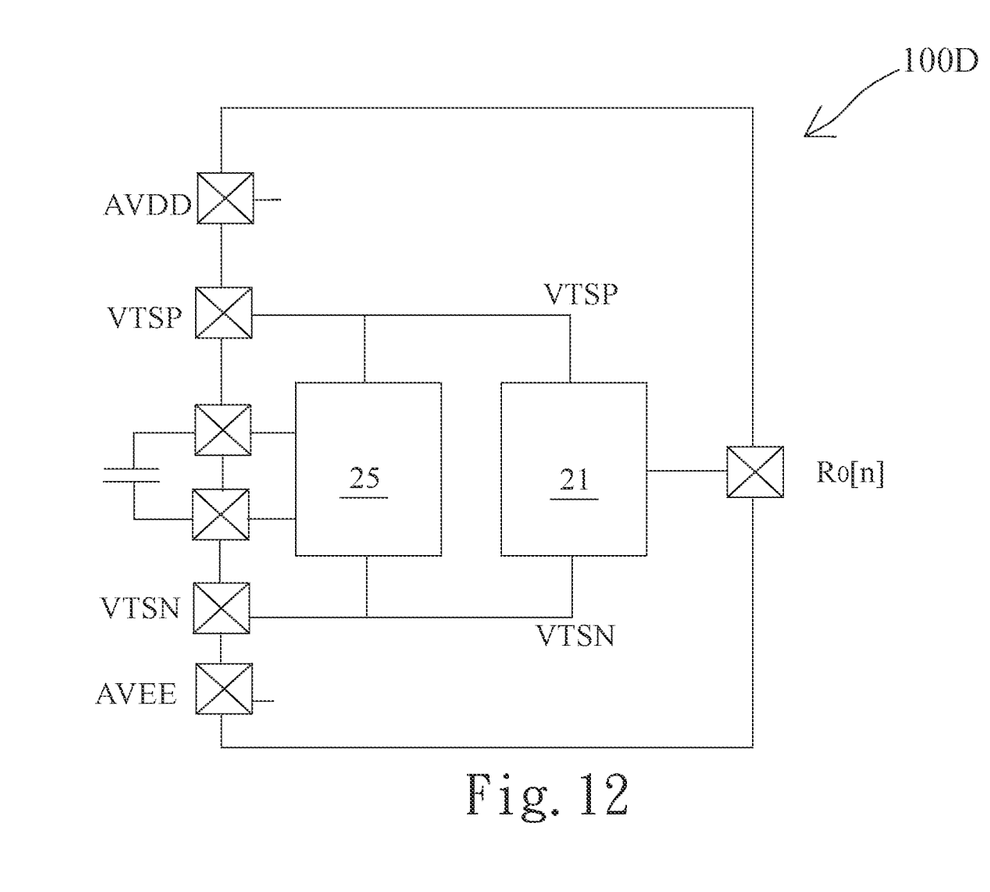
FIG. 12 shows another diagram schematically illustrating a touch and display driving circuit in accordance with a fifth embodiment of the present invention, in which a charge pump circuit is further disposed such that the fourth operational voltage of the analog front-end circuit is an inverse signal of the third operational voltage.

Furthermore, FIG. 12 additionally shows one another diagram schematically illustrating a touch and display driving circuit in accordance with a fifth embodiment of the present invention, in which FIG. 12 is a variant embodiment from FIG. 11. As compared to the embodiment in FIG. 11, it can be found that the disclosed touch and display driving circuit 100D in FIG. 12 further includes a charge pump circuit 25, which is electrically connected between the third operational voltage VTSP and the fourth operational voltage VTSN of the analog front-end circuit 21. By disposing the charge pump circuit 25, it is obtained that the fourth operational voltage VTSN of the analog front-end circuit 21 is an inverse signal of the third operational voltage VTSP of the analog front-end circuit 21, such that (VTSN=(−1)*VTSP) and the variant embodiment proposed herein FIG. 12 may also be adopted for implementing the inventive effects of the present invention. In general, to sum up, it should be noted that according to the foregoing disclosed technical contents provided by the Applicants, it is apparent that the present invention is certainly not limited thereto by the above-mentioned plurality of embodiments. In other words, for people who are skilled in the art and having ordinary understandings and technical backgrounds to the present invention, it would be allowed for them to make various modifications or changes depending on different circuit regulations and/or specifications without departing from the scope of the invention. That is to say, the present invention is certainly not limited thereto and alternative preferable components are compatible. And the variant embodiments and/or circuit implementations should still fall into the claim scope of the present invention.

And as such, based on at least one embodiment provided above, it is believed that the proposed touch and display driving circuit and its operation method of the present invention is characterized by determining the third operational voltage VTSP of the analog front-end circuit greater than a common electrode voltage VCOM of the sensing pad and determining the fourth operational voltage VTSN of the analog front-end circuit less than the common electrode voltage VCOM of the sensing pad, such that the range of the operational voltages of the analog front-end circuit covers the common electrode voltage VCOM of the sensing pad. By such configuration, power optimization for touch and display panel devices is effectively accomplished, and the conventional power consumption waste due to the panel device switching between displaying and sensing modes is believed to be avoided and suppressed.

As a result, by employing the proposed scheme, the present invention is believed as beneficial to reducing IC power consumption. As a result, when compared to the prior arts, it is obvious that the present invention apparently shows much more effective performances than before. In addition, it is believed that the present invention is instinct, effective and highly competitive for IC technology and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A touch and display driving circuit applicable to driving at least one sensing pad of a touch and display panel, comprising:
a source driver circuit, being electrically connected with a first operational voltage and a second operational voltage; and
an analog front-end circuit, being electrically coupled to the at least one sensing pad of the touch and display panel, and the analog front-end circuit being electrically connected with a third operational voltage and a fourth operational voltage, wherein the first operational voltage and the second operational voltage of the source driver circuit are different from the third operational voltage and the fourth operational voltage of the analog front-end circuit.

2. The touch and display driving circuit according to claim 1, wherein the third operational voltage of the analog front-end circuit is greater than a common electrode voltage of the at least one sensing pad, and the fourth operational voltage of the analog front-end circuit is less than the common electrode voltage of the at least one sensing pad.

3. The touch and display driving circuit according to claim 1, wherein when the third operational voltage of the analog front-end circuit is VTSP, the fourth operational voltage of the analog front-end circuit is VTSN, and a maximum operable voltage drop across the analog front-end circuit is VACS, it is determined that (VTSP-VTSN) <VACS.

4. The touch and display driving circuit according to claim 1, wherein the source driver circuit includes a first source driving operational amplifier and a second source driving operational amplifier which is connected in series with the first source driving operational amplifier, the first source driving operational amplifier is electrically connected between the first operational voltage and a ground voltage, and the second source driving operational amplifier is electrically connected between the second operational voltage and the ground voltage.

5. The touch and display driving circuit according to claim 4, wherein the first source driving operational amplifier is a positive-polarity operational amplifier which is operable in a positive-voltage domain.

6. The touch and display driving circuit according to claim 4, wherein the second source driving operational amplifier is a negative-polarity operational amplifier which is operable in a negative-voltage domain.

7. The touch and display driving circuit according to claim 4, wherein the first source driving operational amplifier and the second source driving operational amplifier of the source driver circuit are fabricated by using middle-voltage electrical components.

8. The touch and display driving circuit according to claim 1, wherein the analog front-end circuit is fabricated by using middle-voltage electrical components.

9. The touch and display driving circuit according to claim 1, wherein when the touch and display panel is operated for displaying, the at least one sensing pad of the touch and display panel is electrically connected to a common electrode voltage.

10. The touch and display driving circuit according to claim 1, wherein when the touch and display panel is operated for a touch sense, the at least one sensing pad of the touch and display panel is electrically connected to a sensing voltage, and the sensing voltage is less than the third operational voltage and greater than the fourth operational voltage.

11. The touch and display driving circuit according to claim 1, further comprising at least one regulator circuit, wherein the analog front-end circuit is electrically connected with the at least one regulator circuit, such that the third operational voltage or the fourth operational voltage of the analog front-end circuit is generated in related to the first operational voltage or the second operational voltage of the source driver circuit.

12. The touch and display driving circuit according to claim 1, wherein the third operational voltage or the fourth operational voltage of the analog front-end circuit is generated and provided by a power supplied voltage or by an external power management integrated chip.

13. An operation method of a touch and display driving circuit applicable to driving at least one sensing pad of a touch and display panel, the touch and display driving circuit having a source driver circuit and an analog front-end circuit coupled to the at least one sensing pad, the operation method comprising:
providing a first operational voltage and a second operational voltage to the source driver circuit; and
providing a third operational voltage and a fourth operational voltage to the analog front-end circuit;
wherein the first operational voltage and the second operational voltage are different from the third operational voltage and the fourth operational voltage.

14. The operation method according to claim 13, wherein the third operational voltage of the analog front-end circuit is greater than a common electrode voltage of the at least one sensing pad, and the fourth operational voltage of the analog front-end circuit is less than the common electrode voltage of the at least one sensing pad.

15. The operation method according to claim 13, wherein when the third operational voltage of the analog front-end circuit is VTSP, the fourth operational voltage of the analog front-end circuit is VTSN, and a maximum operable voltage drop across the analog front-end circuit is VACS, it is determined that (VTSP-VTSN)<VACS.

16. The operation method according to claim 13, wherein the source driver circuit includes a first source driving operational amplifier and a second source driving operational amplifier which is connected in series with the first source driving operational amplifier, the first source driving operational amplifier is electrically connected between the first operational voltage and a ground voltage, the second source driving operational amplifier is electrically connected between the second operational voltage and the ground voltage, the first source driving operational amplifier is a positive-polarity operational amplifier which is operable in a positive-voltage domain, and the second source driving operational amplifier is a negative-polarity operational amplifier which is operable in a negative-voltage domain.

17. The operation method according to claim 16, wherein the first source driving operational amplifier and the second source driving operational amplifier of the source driver circuit are fabricated by using middle-voltage electrical components.

18. The operation method according to claim 13, wherein the analog front-end circuit is fabricated by using middle-voltage electrical components.

19. The operation method according to claim 13, wherein when the touch and display panel is operated for displaying, the at least one sensing pad of the touch and display panel is electrically connected to a common electrode voltage, and when the touch and display panel is operated for a touch sense, the at least one sensing pad of the touch and display panel is electrically connected to a sensing voltage, and the sensing voltage is less than the third operational voltage and greater than the fourth operational voltage.

20. The operation method according to claim 13, wherein the analog front-end circuit is further electrically connected with at least one regulator circuit, such that the third operational voltage or the fourth operational voltage of the analog front-end circuit is generated in related to the first operational voltage or the second operational voltage of the source driver circuit.

21. The operation method according to claim 13, wherein the third operational voltage or the fourth operational voltage of the analog front-end circuit is generated and provided by a power supplied voltage or by an external power management integrated chip.

* * * * *